June 26, 1928.
C. G. THURNAU
1,675,146
PULLEY
Filed Dec. 23, 1926
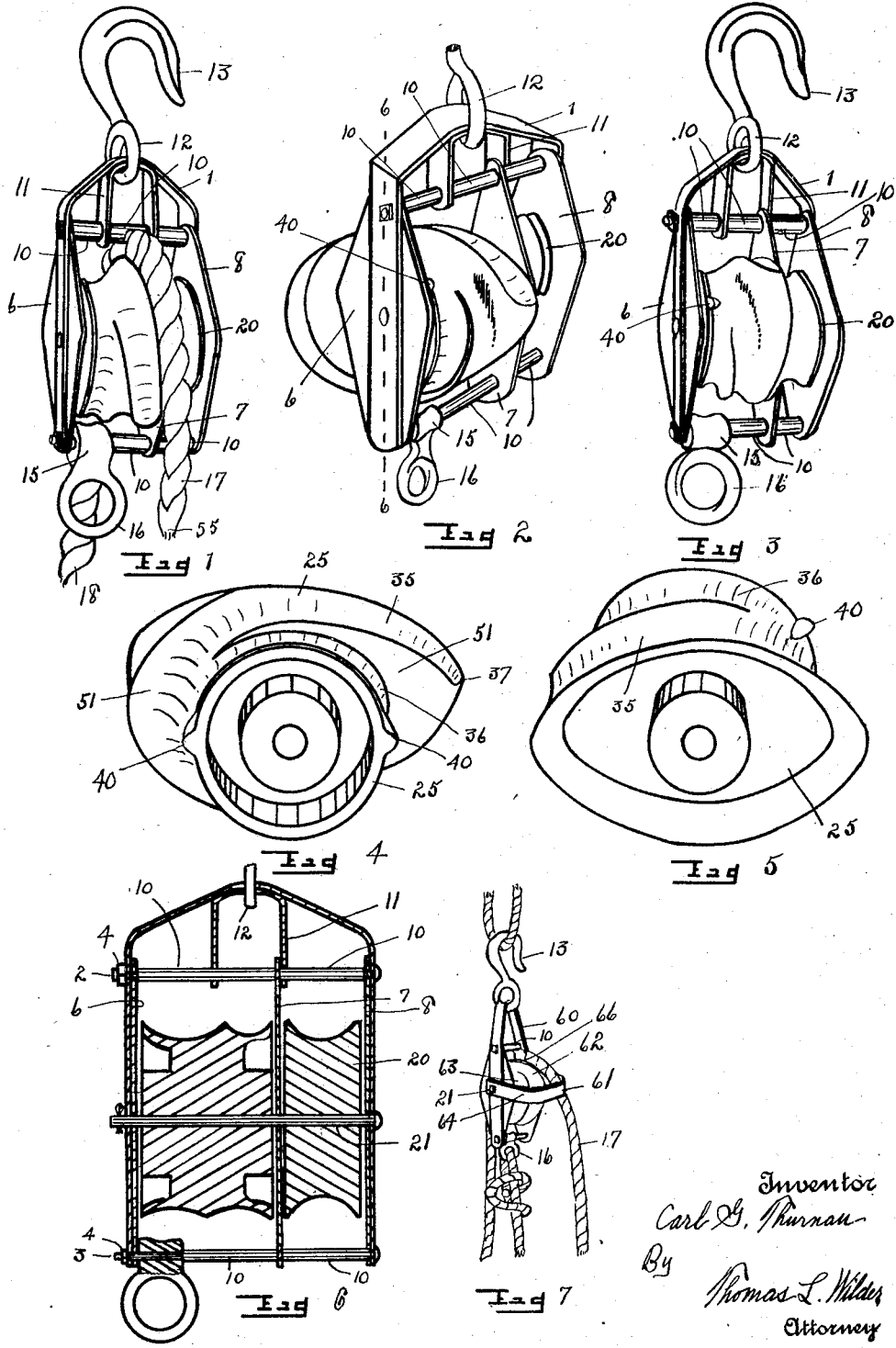
Inventor
Carl G. Thurnau
By
Thomas L. Wilder
Attorney Patented June 26, 1928.

1,675,146

UNITED STATES PATENT OFFICE.

CARL G. THURNAU, OF NEW HARTFORD, NEW YORK.

PULLEY.

Application filed December 23, 1926. Serial No. 156,532.

My invention relates to a pulley and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a pulley more particularly for elevating and lowering scaffolds used by painters, carpenters and generally in building construction. The pulley is equipped with means for automatically gripping and holding the rope, chain or cable suspending the scaffold should the rope break or its free end work loose or accidentally slip, whereby to prevent the scaffolding from falling with serious or even fatal results to the occupant or occupants.

The object will be understood by referring to the drawings in which:

Fig. 1 is a perspective view of the pulley.

Fig. 2 is a perspective view looking at a different angle and with a pulley wheel turned over to a different position from that shown in Fig. 1.

Fig. 3 is a perspective view looking at a still different angle from that shown in Figs. 1 and 2.

Fig. 4 is a detail enlarged view showing a perspective of the novel irregular pulley wheel used.

Fig. 5 is a detail enlarged view showing a perspective of the irregular shaped pulley wheel of Fig. 4 but looking in the opposite direction however.

Fig. 6 is a central vertical section of the pulley taken on line 6, 6 of Fig. 2.

Fig. 7 is a perspective view of a modification of the pulley.

Referring more particularly to the drawings, the device embodies a U-shaped hanger metallic bar 1 to which is mounted headed bolts 2 and 3 held in place by nuts 4, 4. Plates 6, 7 and 8 are carried by bolts 2 and 3. Plates 6 and 8 are held adjacent the inner surfaces of the vertical parts of U-shaped bar 1 and plate 7 in spaced relation to said plates 6 and 8 by spacing sleeves 10 mounted on said bolts 2 and 3. In order to strengthen the device and help support the load, an auxiliary U-shaped bar 11 is mounted on bolt 2 with its upper portion lying adjacent the contiguous upper portion of bar 1. Eye 12 of hook 13 engages the upper parts of U-shaped bars 1 and 11, whereby the pulley frame can be suspended from any well known support. Moreover, a sleeve 15 having a ring 16 formed integral therewith is mounted on lower bolt 3 and is held in place by one of the spacing sleeves 10. One end of rope 17 is tied to ring 16.

A pulley wheel 20 of regular shape is mounted to revolve on an axle 21 which is disposed centrally of plates 6, 7 and 8 and the vertical parts of U-shaped bar 1. Pulley 20 is located between plates 7 and 8.

A pulley wheel 25 of irregular shape, which is one of the novel features of the invention is mounted also on axle 21. The outer peripheral surface of irregular shaped pulley wheel 25 is somewhat extended in width to provide the auxiliary grooves 35, 35 which lead off from the main groove 36 at diametrically opposite locations of the pulley. The main groove 36 is intended for the disposition of the rope when running under normal conditions. Each of the auxiliary grooves 35 gradually rises and is brought to an end as at 37 that is elevated above the surface of main groove 36, whereby to pinch rope 17 between the surface of pulley 25 and the sleeve 10 upon bolt 2 when said pulley wheel 25 is turned at the proper angle. It will be observed from Fig. 4 that the auxiliary grooves 35 develop the side of irregular shape pulley wheel 25 into an ellipse.

In order to cause rope 17 to leave main groove 36 in case of emergency as when rope 17 breaks or the end 18 accidentally becomes loose, nubs or raised portions 40 are formed diametrically opposite the entrance to said grooves 35 respectively.

In operation, the end 18 of rope 17 is tied to ring 16 and descends and then upward and over regular shaped pulley wheel 20 to form a loop adapted to engage a lower tackle block, not shown. From wheel 20 it again descends and engages said lower tackle block and thence upward and over main groove 36 of irregular shaped pulley wheel 25, thence down where it will be secured in any well known manner. In the event that rope 17 breaks or becomes loose accidentally the pulley and the free end 55 of rope 17 which free end is fastened to hold the scaffold or other load in place, would cause said rope 17 to travel and hence pulley wheel 20 and irregular shaped pulley wheel 25 to revolve rapidly. During this rotation of pulley wheel 25 one of the nubs 40 would make contact with rope 17 and divert it into the adjacent auxiliary groove 35 of irregular shaped pulley 25 whereupon it would come in contact with the surface of sleeve 10 on bolt 2 and be pinched between said surface and the contiguous surface of irregular shaped pulley wheel 25 where it would lodge and be held, thereby stopping the fall of the scaffolding, not shown, as seen in Fig. 1.

In order to release rope 17 from its lodged position between sleeve 10 and wheel 25, said rope 17 must be drawn or pulled in the reverse direction, whereby to rotate pulley wheel 25 in the opposite direction and thereby withdraw the engaging part 37 of pulley wheel 25 away from sleeve 10 to free rope 17 and allow it to run back into main groove 36.

Rope 17 will run back into main groove 36 because of the beveled surface 51 contiguous with groove 35 which beveled surface 51 will aid in getting rope 17 back into main groove 36 of pulley wheel 25.

The modification shows a metallic strap or bridle 61 fastened to center axle 21 and extending laterally from the pulley frame 60 outwardly and around to the opposite side. Rope 17 is disposed between the inner surface of strap 61 and the peripheral surface of pulley wheel 62. Strap 61 serves the same function performed by nubs 40 of the former construction. In the event that the rope 17 breaks or is freed accidentally from its holdings the increased velocity of rotation of wheel 61 occasioned by the rapidly moving rope 17 will throw by centrifugal force rope 17 outward and away from the surface of main groove 63. Rope 17 will be forced therefore against the inner surface of strap 61 and by the curvature at 64 of said strap 61 caused to move towards the right hand side of the pulley wheel 62 into one of the auxiliary grooves 66 and thence lodge between sleeve 10 and the surface of groove 66 corresponding to 35 of the former construction.

Having thus described my invention what I claim as new and desire to secure by Letters Patent is as follows:

1. In a pulley, a frame, a pulley mounted to rotate on said frame, a groove in said pulley for guiding a rope, auxiliary grooves communicating with said first named groove, and nubs formed on the side of said groove for directing said rope out of said groove, whereby said rope will lodge between the pulley and the frame to stop the rotation thereof.

2. In a pulley, a groove for guiding a rope, an irregular shaped groove, communicating with said first named groove, and a nub disposed on the side of said first named groove, whereby to direct the rope into said irregular shaped groove to prevent the rotation of said pulley.

In testimony whereof I have affixed my signature.

CARL G. THURNAU.